United States Patent
Suk et al.

(10) Patent No.: US 10,587,797 B2
(45) Date of Patent: Mar. 10, 2020

(54) METHOD, SYSTEM AND NON-TRANSITORY COMPUTER-READABLE RECORDING MEDIUM FOR COMPENSATING BRIGHTNESS OF BALL IMAGES

(71) Applicant: CREATZ Inc., Gyeonggi-do (KR)

(72) Inventors: Yong Ho Suk, Gyeonggi-do (KR); Jey Ho Suk, Seoul (KR)

(73) Assignee: CREATZ INC., Gyeonggi-Do (KR)

( * ) Notice: Subject to any disclaimer, the term of this patent is extended or adjusted under 35 U.S.C. 154(b) by 179 days.

(21) Appl. No.: 15/637,396

(22) Filed: Jun. 29, 2017

(65) Prior Publication Data
US 2018/0005396 A1    Jan. 4, 2018

(30) Foreign Application Priority Data
Jun. 29, 2016  (KR) .......................... 10-2016-0081874

(51) Int. Cl.
| | |
|---|---|
| *H04N 5/232* | (2006.01) |
| *H04N 5/243* | (2006.01) |
| *H04N 5/235* | (2006.01) |
| *A63B 69/36* | (2006.01) |

(52) U.S. Cl.
CPC ..... *H04N 5/23229* (2013.01); *A63B 69/3658* (2013.01); *H04N 5/2351* (2013.01); *H04N 5/243* (2013.01)

(58) Field of Classification Search
None
See application file for complete search history.

(56) References Cited

U.S. PATENT DOCUMENTS

| | | | | |
|---|---|---|---|---|
| 2014/0294292 | A1* | 10/2014 | Aoba | G06K 9/00208 382/159 |
| 2015/0356744 | A1* | 12/2015 | Joo | G06K 9/46 473/198 |
| 2017/0200277 | A1* | 7/2017 | Keat | G06T 7/248 |
| 2017/0365067 | A1* | 12/2017 | Jang | G06T 7/74 |

FOREIGN PATENT DOCUMENTS

| | | |
|---|---|---|
| KR | 20090112538 A | 10/2009 |

* cited by examiner

*Primary Examiner* — Justin P. Misleh
(74) *Attorney, Agent, or Firm* — Dinsmore & Shohl LLP; Yongsok Choi, Esq.

(57) ABSTRACT

The present invention relates to a method, system and non-transitory computer-readable recording medium for compensating brightness of ball images. According to one aspect of the invention, there is provided a method for compensating brightness of ball images. The method includes calculating photographed brightness distribution of a region corresponding to a ball in each of a plurality of images in which the ball is photographed, and compensating the photographed brightness distribution of the region corresponding to the ball in at least one of the plurality of images, with reference to reference brightness distribution.

9 Claims, 5 Drawing Sheets

100

200

METHOD, SYSTEM AND NON-TRANSITORY COMPUTER-READABLE RECORDING MEDIUM FOR COMPENSATING BRIGHTNESS OF BALL IMAGES

CROSS-REFERENCE TO RELATED APPLICATIONS

This application claims priority to Korean Patent Application No. 10-2016-0081874 filed on Jun. 29, 2016, the entire contents of which are hereby incorporated by reference.

FIELD OF THE INVENTION

The present invention relates to a method, system and non-transitory computer-readable recording medium for compensating brightness of ball images.

BACKGROUND

Virtual golf systems are widely spreading which allow golfers to virtually play golf at low cost in downtown areas and the like. The basic concept of such virtual golf systems is to acquire a number of photographed images of a golf ball upon being hit by a golfer, measure physical quantities of the golf ball on the basis of the trajectory, interval, size and the like thereof, perform a simulation of the shot, and display a result of the simulation on a screen. In the virtual golf systems, it is important to acquire the photographed images of the golf ball as good as possible.

In this connection, a technique for photographing a golf training session while adjusting the location or color of illumination to acquire more diverse images of a golf ball has been disclosed in Korean Laid-open Patent Publication No. 10-2009-0112538 (entitled, "APPARATUS FOR OBTAINING GOLF IMAGES USING ILLUMINATION CONTROL, AND GOLF PRACTICE SYSTEM BASED ON IMAGE PROCESSING USING IT"), the contents of which are incorporated herein by reference in its entirety. However, various conventional techniques including the above one have not been concerned with a technique required to acquire golf ball images in a good state, which is necessary in accurately measuring a physical quantity of a golf ball, or a technique for measuring physical quantities of a golf ball using a mark sequence obtainable from a plurality of golf ball images.

Therefore, the inventor(s) present a novel technique for accurately measuring physical quantities of a golf ball by analyzing a mark sequence appearing in golf ball images obtained from a high-speed camera capable of photographing many frames of images for a short time.

SUMMARY OF THE INVENTION

One object of the present invention is to analyze a mark sequence appearing in a plurality of golf ball images to measure a spin rate and a spin direction of a golf ball.

Another object of the invention is to compensate brightness (specifically, brightness distribution) of a plurality of golf ball images so that the brightness distribution of the plurality of golf ball images is made uniform.

The representative configurations of the invention to achieve the above objects are described below.

According to one aspect of the invention, there is provided a method for compensating brightness of ball images, comprising the steps of: calculating photographed brightness distribution of a region corresponding to a ball in each of a plurality of images in which the ball is photographed, wherein a physical quantity of the ball is to be measured; and compensating the photographed brightness distribution of the region corresponding to the ball in at least one of the plurality of images, with reference to reference brightness distribution.

According to another aspect of the invention, there is provided a system for compensating brightness of ball images, comprising: an image acquisition unit for acquiring a plurality of images in which a ball is photographed, wherein a physical quantity of the ball is to be measured; and an image compensation unit for calculating photographed brightness distribution of a region corresponding to the ball in each of the plurality of images, and compensating the photographed brightness distribution of the region corresponding to the ball in at least one of the plurality of images, with reference to reference brightness distribution.

In addition, there are further provided other methods, systems and non-transitory computer-readable recording media to implement the present invention.

According to the invention, brightness distribution may be made uniform over a plurality of golf ball images as well as within each golf ball image, so that a mark sequence appearing in the plurality of golf ball images may be detected more accurately.

According to the invention, a spin rate and a spin direction of a golf ball may be accurately measured using a time-sequential set of marks (i.e., a mark sequence) appearing over a plurality of golf ball images.

DETAILED DESCRIPTION

Figure 1:
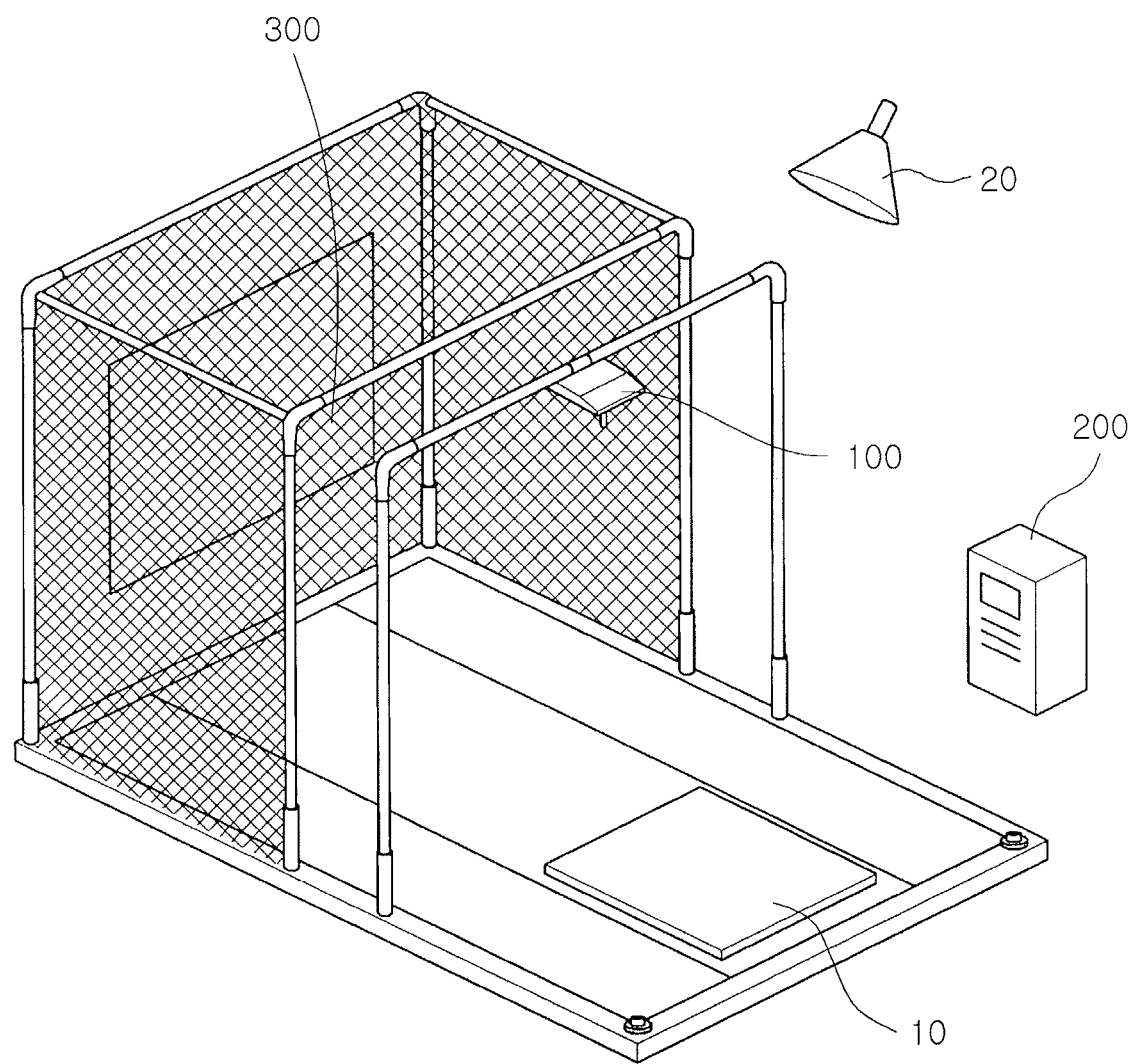
FIG. 1 is a schematic diagram of the overall configuration of a virtual golf system according to one embodiment of the invention.

In the following detailed description of the invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, or characteristics described herein may be implemented as modified from one embodiment to another embodiment without departing from the spirit and the scope of the invention. Furthermore, it shall be understood that the locations or arrangements of individual elements within each embodiment may be also modified without departing from the spirit and the scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of Overall System

FIG. 1 is a schematic diagram of the overall configuration of a virtual golf system according to one embodiment of the invention.

As shown in FIG. 1, the virtual golf system may be configured to comprise a shot unit 10, an illumination device 20, a photographing device 100, a simulator 200, and a display device 300.

First, the shot unit 10 according to one embodiment of the invention may be a part on which a golfer steps up to place and hit a golf ball when using the virtual golf system. The shot unit 10 may comprise a known swing plate, the tilt angle of which may be adjusted. It will be note that when the invention is applied to other kinds of virtual sport systems, those skilled in the art may modify the configuration of the shot unit 10 and, if necessary, those of other components associated therewith to suit to the characteristics of the corresponding sports.

Next, the illumination device 20 according to one embodiment of the invention may irradiate light artificially when a golfer plays virtual golf indoors or outdoors. As necessary, the illumination device 20 may be turned on and off, or the brightness thereof may be adjusted. Preferably, the illumination device 20 may be an infrared illumination device for preventing natural deterioration of the images of the golf ball caused by the flickering of the light.

Next, the photographing device 100 according to one embodiment of the invention may comprise at least one camera (e.g., a high-speed camera) (not shown) and function to acquire two or more images of the golf ball (e.g., images of the moving golf ball). As shown in FIG. 1, the photographing device 100 may be disposed in a location to look down at the moving golf ball, while it may be disposed in other locations.

According to one embodiment of the invention, an image of the golf ball may be considered to be better if a mark on the surface of the golf ball is clearly shown such that a shape or location of the mark may be better specified. For example, if the mark shown in a region corresponding to the ball in the image of the golf ball is clearer, the simulator 200 to be described below may more accurately identify a mark sequence, which is a time-sequential set of marks appearing over a plurality of golf ball images, and calculate a spin rate and a spin direction of the golf ball. As another example, if the images of the golf ball are clearer, the simulator 200 may more accurately identify center points or maximum brightness points of the multiple golf ball images and calculate brightness distribution of the regions corresponding to the golf ball.

The detailed configuration of the photographing device 100 will be further described later with reference to FIG. 2.

Next, the simulator 200 according to one embodiment of the invention may function to acquire from the photographing device 100 a plurality of images in which a ball whose physical quantity is to be measured is photographed, calculate photographed brightness distribution of a region corresponding to the ball in each of the plurality of images, and compensate the photographed brightness distribution of the region corresponding to the ball in at least one of the plurality of images, with reference to reference brightness distribution, so that brightness distribution of the plurality of golf ball images is made uniform. Further, the simulator 200 according to one embodiment of the invention may also function to analyze a time-sequential set of marks appearing over the plurality of golf ball images compensated as above (i.e., a mark sequence) to measure a spin rate and a spin direction of the golf ball. Furthermore, the simulator 200 according to one embodiment of the invention may implement movement of the golf ball in virtual reality, on the basis of information on the spin rate and spin direction of the golf ball measured as above.

Meanwhile, the simulator 200 according to one embodiment of the invention may communicate with the photographing device 100 and the display device 300, and may comprise a dedicated processor for virtual golf simulation. The dedicated processor may be provided with memory means and may have numerical operation and graphics processing capabilities.

The configuration of the simulator 200 will be further described later with reference to FIG. 3.

Lastly, the display device 300 according to one embodiment of the invention may function to display a result of the physical quantity measurement or virtual reality implementation of the simulator 200. The display device 300 may display images via display means and, for example, may be configured with a screen, which absorbs the impact of the hit golf ball and does not emit light directly, and a projector to output images on the screen.

Configuration of Photographing Device

Hereinafter, the internal configuration of the photographing device 100 according to one embodiment of the invention and the functions of the respective components thereof will be described.

Figure 2:
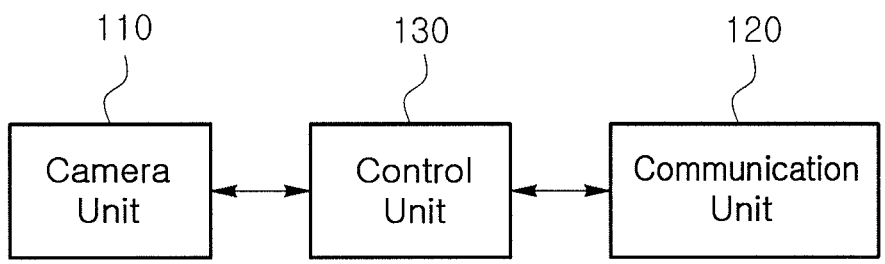
FIG. 2 is a detailed diagram of the internal configuration of a photographing device 100 according to one embodiment of the invention.

FIG. 2 is a detailed diagram of the internal configuration of the photographing device 100 according to one embodiment of the invention.

As shown in FIG. 2, the photographing device 100 may be configured to comprise a camera unit 110, a communication unit 120 and a control unit 130.

According to one embodiment of the invention, at least some of the camera unit 110, the communication unit 120 and the control unit 130 may be program modules to communicate with the simulator 200. The program modules may be included in the photographing device 100 in the form of operating systems, application program modules or other program modules, while they may be physically stored in a variety of commonly known storage devices. Further, the program modules may also be stored in a remote storage device that may communicate with the photographing device 100. Meanwhile, such program modules may include, but not limited to, routines, subroutines, programs, objects, components, data structures and the like for performing specific tasks or executing specific abstract data types as will be described below in accordance with the present invention.

First, the camera unit 110 according to one embodiment of the invention may comprise a camera that may optically acquire a plurality of images. For example, the camera unit 110 according to one embodiment of the invention may comprise a high-speed or ultrahigh-speed camera capable of photographing tens of frames of images per second. According to one embodiment of the invention, the camera of the camera unit 110 may photograph and acquire some images when a moving golf ball exists or not.

Next, the communication unit 120 according to one embodiment of the invention may function to mediate data transmission/reception between the control unit 130 and the simulator 200, as necessary. According to one embodiment of the invention, although there is no particular limitation on the communication modality that may be employed by the communication unit 120, wired communication such as wired LAN communication and cable communication, or wireless communication such as wireless LAN communication, infrared communication, RF communication and Bluetooth communication may preferably be employed.

Lastly, the control unit 130 according to one embodiment of the invention may function to control data flow among the camera unit 110 and the communication unit 120. That is, the control unit 130 according to the invention may control inbound/outbound data flow of the photographing device 100 or data flow among the respective components of the photographing device 100, such that the camera unit 110 and the communication unit 120 may carry out their particular functions, respectively.

Configuration of Simulator

Hereinafter, the internal configuration of the simulator 200 according to one embodiment of the invention and the functions of the respective components thereof will be described.

Figure 3:
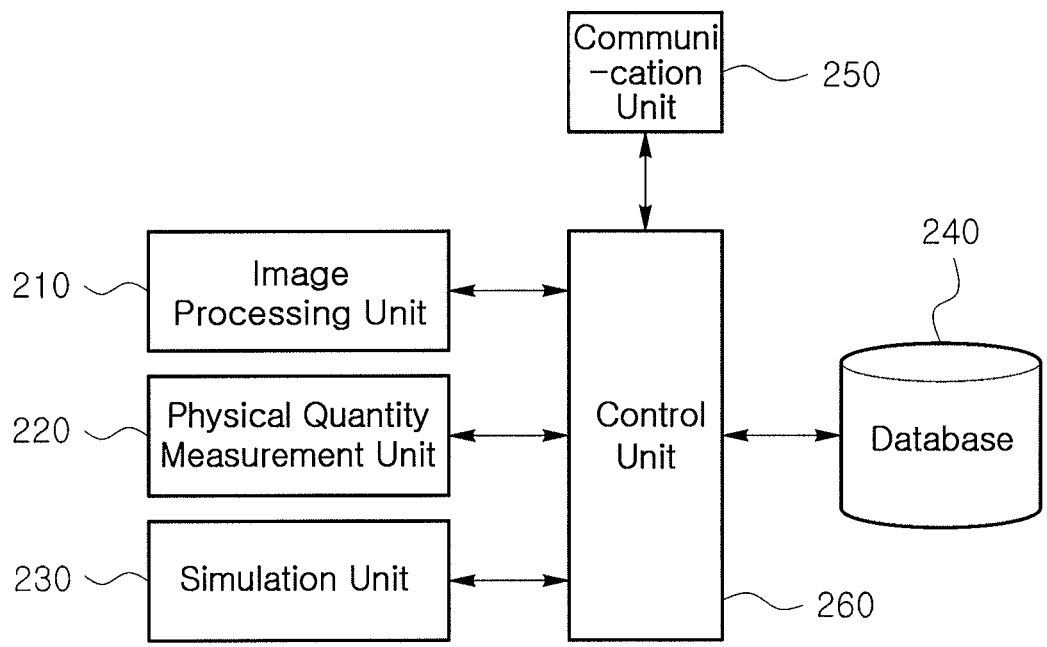
FIG. 3 is a detailed diagram of the internal configuration of a simulator 200 according to one embodiment of the invention.

FIG. 3 is a detailed diagram of the internal configuration of the simulator 200 according to one embodiment of the invention.

As shown in FIG. 3, the simulator 200 according to one embodiment of the invention may be configured to comprise an image processing unit 210, a physical quantity measurement unit 220, a simulation unit 230, a database 240, a communication unit 250, and a control unit 260. Further, according to one embodiment of the invention, the image processing unit 210 may comprise an image acquisition unit (not shown) and an image compensation unit (not shown). According to one embodiment of the invention, at least some of the image processing unit 210, the physical quantity measurement unit 220, the simulation unit 230, the database 240, the communication unit 250, and the control unit 260 may be program modules to communicate with the photographing device 100 or the display device 300. The program modules may be included in the simulator 200 in the form of operating systems, application program modules or other program modules, while they may be physically stored in a variety of commonly known storage devices. Further, the program modules may also be stored in a remote storage device that may communicate with the simulator 200. Meanwhile, such program modules may include, but not limited to, routines, subroutines, programs, objects, components, data structures and the like for performing specific tasks or executing specific abstract data types as will be described below in accordance with the present invention.

Meanwhile, although the simulator 200 has been described as above, the above description is illustrative and it will be apparent to those skilled in the art that all or a part of the functions or components required for the simulator 200 may be implemented or included in the photographing device 100, as necessary.

First, according to one embodiment of the invention, the image processing unit 210 (specifically, the image acquisition unit) may function to acquire from the photographing device 100 a plurality of images in which a ball whose physical quantity is to be measured is photographed.

Figure 4A:
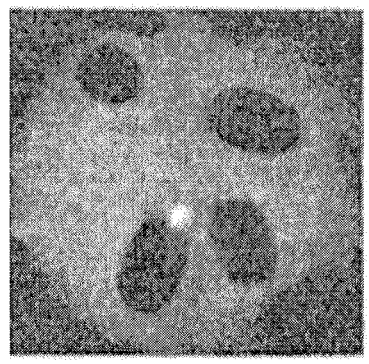
FIGS. 4A and 4B illustratively show golf ball images actually photographed according to one embodiment of the invention.
Figure 4B:
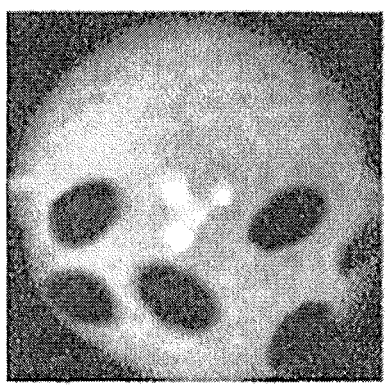

FIGS. 4A and 4B illustratively show golf ball images actually photographed according to one embodiment of the invention.

Referring to FIGS. 4A and 4B, brightness distribution of a region corresponding to a ball in a plurality of images may vary from image to image, due to various environmental factors such as the location of illumination, the irradiation direction or intensity of light, the location, specification, or setting of a camera, and the position or color of the ball. For example, the brightness of the region corresponding to the ball may be generally dark (see FIG. 4A), and the brightness of the central part of the region corresponding to the ball may be excessively brighter than the other parts thereof (see FIG. 4B).

First, according to one embodiment of the invention, the image processing unit 210 (specifically, the image compensation unit) may function to calculate photographed brightness distribution of a region corresponding to a ball in each of a plurality of images in which the ball is photographed, wherein a physical quantity of the ball is to be measured.

Specifically, the image compensation unit according to one embodiment of the invention may specify a region corresponding to the ball in each of the plurality of images by calculating a center point, a maximum brightness point, a radius or the like of the region corresponding to the ball in each of the images. Further, the image compensation unit according to one embodiment of the invention may calculate brightness distribution of the region corresponding to the ball in each of the plurality of images, with respect to a predetermined point (e.g., a center point, a maximum brightness point, etc.) in the region corresponding to the ball.

More specifically, the image compensation unit according to one embodiment of the invention may calculate the brightness distribution of the region corresponding to the ball in each of the plurality of images using a stochastic or statistical model such as a linear regression model and a non-parametric model.

For example, a relationship between a distance from a maximum brightness point to an arbitrary point in the region corresponding to the ball in each of the plurality of images and brightness of the arbitrary point may be derived on the basis of a linear regression model. As another example, brightness of an arbitrary point in the region corresponding to the ball in each of the plurality of images may be calculated on the basis of a non-parametric model such as a blurring filter, a low pass filter, and a Gaussian filter.

Further, according to one embodiment of the invention, the image processing unit 210 (specifically, the image compensation unit) may function to compensate the photographed brightness distribution of the region corresponding to the ball in at least one of the plurality of images, with reference to reference brightness distribution. Here, according to one embodiment of the invention, the reference brightness distribution is predetermined brightness distribution suitable for detecting and recognizing a mark on the surface of the ball, and may be stored in the database 240.

Specifically, the image compensation unit according to one embodiment of the invention may compensate the photographed brightness distribution of the region corresponding to the ball in the image to be compensated, such that uniformity of the photographed brightness distribution of the region corresponding to the ball in the image is equal to or greater than a predetermined level.

More specifically, the image compensation unit according to one embodiment of the invention may compare first photographed brightness distribution of a region corresponding to the ball in a first image and reference brightness distribution to calculate a compensation model for compensating the first photographed brightness distribution, and may compensate the first photographed brightness distribution with reference to the calculated compensation model.

For example, the compensation model according to one embodiment of the invention may be expressed by the equations (1) and (2) below.

$$E(P)=c*B(P)+d \qquad (1)$$

$$F(P)=B(P)+E(P) \text{ or } F(P)=B(P)*E(P) \qquad (2)$$

In the equations (1) and (2), B(P) denotes brightness of an arbitrary point P; E(P) denotes a compensation model for the brightness of the point P; c and d denote compensation coefficients for specifying the compensation model E(P); and F(P) denotes the brightness of the point P compensated (i.e., uniformized) by the compensation model E(P).

Figure 5A:
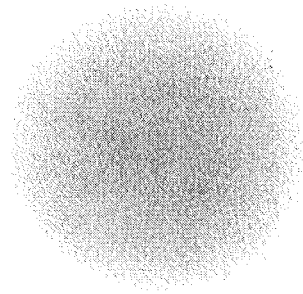
FIGS. 5A and 5B visually show compensation models that may be applied to golf ball images according to one embodiment of the invention.
Figure 5B:
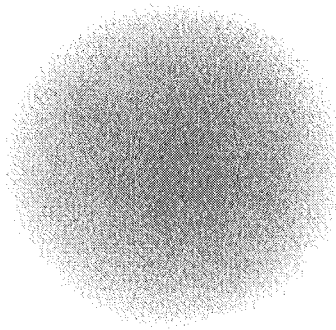

FIGS. 5A and 5B visually show compensation models that may be applied to golf ball images according to one embodiment of the invention. FIGS. 5A and 5B visualize the compensation models that may be applied to the images of FIGS. 4A and 4B, respectively.

Figure 6A:
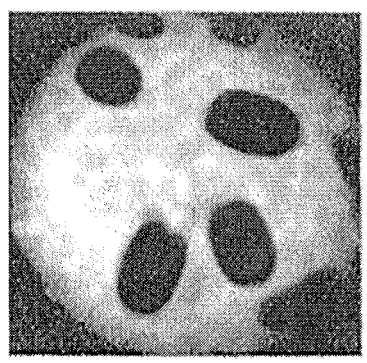
FIGS. 6A and 6B illustratively show golf ball images whose brightness has been compensated according to one embodiment of the invention.
Figure 6B:
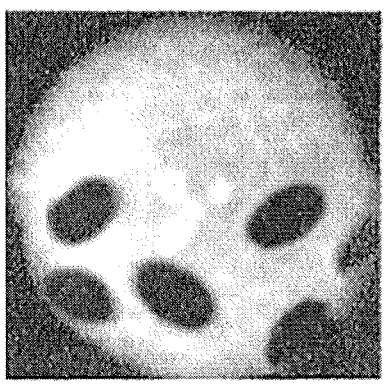

FIGS. 6A and 6B illustratively show golf ball images whose brightness has been compensated according to one embodiment of the invention.

Referring to FIGS. 6A and 6B, it can be seen that the brightness distribution of the region corresponding to the ball in each of the golf ball images shown in FIGS. 4A and 4B has been made uniform.

As described above, according to one embodiment of the invention, brightness distribution of regions corresponding to a ball may be compensated (i.e., made uniform) over a plurality of golf ball images as well as within each golf ball image, so that a mark commonly appearing over the plurality of images may be detected and recognized more accurately by reducing the potential for errors due to brightness differences.

However, it is noted that the method for compensating brightness distribution of golf ball images according to the invention is not necessarily limited to the above-described algorithm, but may be changed without limitation as long as the objects of the invention can be achieved.

Meanwhile, the physical quantity measurement unit 220 according to one embodiment of the invention may function to analyze a mark sequence appearing in the plurality of golf ball images (more specifically, the plurality of temporally adjacent golf ball images) which have been compensated (i.e., whose bright distribution has been made uniform) as above, thereby measuring a spin rate and a spin direction of the golf ball. Specifically, the physical quantity measurement unit 220 according to one embodiment of the invention may estimate the spin rate and spin direction of the golf ball with reference to a moving speed and a moving direction of the mark on the surface of the golf ball observed from the above mark sequence. Further, the physical quantity measurement unit 220 according to one embodiment of the invention may also function to calculate a movement trajectory, a moving speed, or a height of the golf ball.

Next, the simulation unit 230 according to one embodiment of the invention may implement movement of the golf ball (e.g., a spin rate, a spin direction, a moving speed, a moving direction, an angle of departure, etc.) in virtual reality, on the basis of a variety of information on the physical quantities of the golf ball measured as above. Further, the simulation unit 230 according to one embodiment of the invention may transmit to the display device 300 a control signal reflecting the movement of the golf ball in a graphical object or containing a video signal, so that the movement of the golf ball may be realistically displayed in the display device 300.

Next, the database 240 according to one embodiment of the invention may store information on the photographed images of the golf ball, the images in which brightness distribution of the golf ball has been compensated, the mark sequence, the calculated physical quantities and the like, or information required for the simulation (e.g., data required to implement the virtual reality). Although FIG. 3 shows that the database 240 is incorporated in the simulator 200, the database 240 may be configured separately from the simulator 200 as needed by those skilled in the art to implement the invention. Meanwhile, the database 240 according to the invention encompasses a computer-readable recording medium, and may refer not only to a database in a narrow sense but also to a database in a broad sense including file system-based data records and the like. The database 240 according to the invention may be even a collection of simple logs if one can search and retrieve data from the collection.

Next, the communication unit 250 according to one embodiment of the invention may function to enable data transmission/reception to/from the simulator 200. Although there is no particular limitation on the communication modality that may be employed by the communication unit 250, wired communication such as wired LAN communication and cable communication, or wireless communication such as wireless LAN communication, infrared communication, RF communication, and Bluetooth communication may preferably be employed.

Lastly, the control unit 260 according to one embodiment of the invention may function to control data flow among the image processing unit 210, the physical quantity measurement unit 220, the simulation unit 230, the database 240, and the communication unit 250. That is, the control unit 260 according to the invention may control inbound/outbound data flow of the simulator 200 or data flow among the respective components of the simulator 200, such that the image processing unit 210, the physical quantity measurement unit 220, the simulation unit 230, the database 240, and the communication unit 250 may carry out their particular functions, respectively.

Although it has been mainly described above that the virtual sport system of the present invention is a virtual golf system, it will be apparent to those skilled in the art that the technical principle and configuration of the invention may be applied to all kinds of virtual sport systems (e.g., virtual baseball systems or virtual football systems) requiring simulation of the movement of a ball.

The embodiments according to the present invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be changed to one or more software modules to perform the operations of the present invention, and vice versa.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for compensating brightness of ball images, comprising the steps of:
    acquiring a plurality of images in which a ball is photographed, wherein a physical quantity of the ball is to be measured;
    specifying a region corresponding to the ball in each of the plurality of images;
    calculating photographed brightness distribution of the region corresponding to the ball in each of the plurality of images; and
    compensating the photographed brightness distribution of the region corresponding to the ball in at least one of the plurality of images, with reference to reference brightness distribution,
    wherein the compensating step comprises the steps of:
    comparing first photographed brightness distribution of the region corresponding to the ball in a first image and the reference brightness distribution to calculate a compensation model for compensating the first photographed brightness distribution; and
    compensating the first photographed brightness distribution with reference to the calculated compensation model, and
    wherein the compensation model is expressed by the following equations:

$E(P)=c*B(P)+d$; and $F(P)=B(P)+E(P)$ or $F(P)=B(P)*E(P)$, where B(P) denotes brightness of an arbitrary point P in the region corresponding to the ball in the first image; E(P) denotes a compensation model for the brightness of the point P; c and d denote compensation coefficients for specifying the compensation model E(P); and F(P) denotes the brightness of the point P compensated by the compensation model E(P).

2. The method of claim 1, wherein in the calculating step, the photographed brightness distribution is calculated using at least one of a linear regression model and a non-parametric model.

3. The method of claim 1, wherein in the calculating step, the photographed brightness distribution is calculated with respect to at least one of center coordinates and maximum brightness coordinates of the region corresponding to the ball in each of the plurality of images.

4. The method of claim 1, wherein in the compensating step, the compensation is performed such that uniformity of the photographed brightness distribution of the region corresponding to the ball in the at least one image is equal to or greater than a predetermined level.

5. A computer-readable recording medium having stored thereon a computer program for executing the method of claim 1.

6. A system for compensating brightness of ball images, comprising:
    an image acquisition unit for acquiring a plurality of images in which a ball is photographed, wherein a physical quantity of the ball is to be measured; and
    an image compensation unit for specifying a region corresponding to the ball in each of the plurality of images, calculating photographed brightness distribution of the region corresponding to the ball in each of the plurality of images, and compensating the photographed brightness distribution of the region corresponding to the ball in at least one of the plurality of images, with reference to reference brightness distribution,
    wherein the image compensation unit compares first photographed brightness distribution of the region corresponding to the ball in a first image and the reference brightness distribution to calculate a compensation model for compensating the first photographed brightness distribution, and compensates the first photographed brightness distribution with reference to the calculated compensation model, and
    wherein the compensation model is expressed by the following equations:

$E(P)=c*B(P)+d$; and $F(P)=B(P)+E(P)$ or $F(P)=B(P)*E(P)$, where B(P) denotes brightness of an arbitrary point P in the region corresponding to the ball in the first image; E(P) denotes a compensation model for the brightness of the point P; c and d denote compensation coefficients for specifying the compensation model E(P); and F(P) denotes the brightness of the point P compensated by the compensation model E(P).

7. The system of claim 6, wherein the image compensation unit calculates the photographed brightness distribution using at least one of a linear regression model and a non-parametric model.

8. The system of claim 6, wherein the image compensation unit calculates the photographed brightness distribution with respect to at least one of center coordinates and maximum brightness coordinates of the region corresponding to the ball in each of the plurality of images.

9. The system of claim 6, wherein the image compensation unit performs the compensation such that uniformity of the photographed brightness distribution of the region corresponding to the ball in the at least one image is equal to or greater than a predetermined level.

* * * * *